United States Patent

Oyzboyd

[11] Patent Number: 5,536,420
[45] Date of Patent: Jul. 16, 1996

[54] VERTICAL DRAINAGE DRYING BED FOR WASTE SLUDGE AND AN INTENSIFIED METHOD OF TREATING WASTEWATER

[76] Inventor: Boris Oyzboyd, 1504 D Dresden Dr., NE., Atlanta, Ga. 30319

[21] Appl. No.: 475,223

[22] Filed: Jun. 7, 1995

Related U.S. Application Data

[62] Division of Ser. No. 285,053, Aug. 3, 1994.

[51] Int. Cl.$^6$ .................................................. C02F 11/16
[52] U.S. Cl. ........................... 210/804; 210/806; 210/609
[58] Field of Search .................................. 210/170, 256, 210/257.1, 259, 290, 291, 323.2, 335, 339, 340, 342, 459, 460, 461, 609, 803, 804, 806; 405/41, 42, 43, 51

[56] References Cited

U.S. PATENT DOCUMENTS

| | | | |
|---|---|---|---|
| 272,881 | 2/1883 | Houghton | 210/323.2 |
| 332,610 | 12/1885 | James | 210/170 |
| 476,737 | 6/1892 | Deutsch | 210/291 |
| 497,856 | 5/1893 | Brown | 210/459 |
| 770,019 | 9/1904 | Neireiter | 210/459 |
| 1,456,759 | 5/1923 | Booth | 210/170 |
| 1,606,990 | 11/1926 | Fimk | 405/42 |
| 2,135,860 | 11/1938 | Taysin | 405/43 |
| 3,722,686 | 3/1973 | Arnett et al. | 210/170 |
| 4,075,102 | 2/1978 | Ferris | 210/291 |
| 4,094,790 | 6/1978 | Schmidt, Sr. | 210/291 |
| 4,752,402 | 6/1988 | Gray | 210/804 |
| 5,232,599 | 8/1993 | Cole | 210/609 |

FOREIGN PATENT DOCUMENTS

1206233A 3/1989 Ukraine.

OTHER PUBLICATIONS

"Operation of Wastewater Treatment Plants" Prepared under direction of the Technical Practice Committee 1976, pp. II, V, 307, 309, 308, 318, 319, 322.
USEP "The Original Vacuum Sludge Dewatering Bed". U.S. Environmental Products, Inc. ©1985.
"Operation of Wastewater Treatment Plants" vol. II. A Field Study Training Program EPA pp. 46, 47, 48, 49, 50, 51.

Primary Examiner—Christopher Upton
Attorney, Agent, or Firm—Kennedy & Kennedy

[57] ABSTRACT

A drying bed for waste sludge in a wastewater treatment facility having a vertical drainage riser extending vertically from a subnatant discharge pipe near the bottom of the drying bed. A sludge inlet at an end of the drying bed communicates with a source of watery sludge. Water communicates through a mesh screen that wraps the vertical drainage riser and through openings in the vertical drainage riser to the subnatant discharge pipe. A valve is selectively opened to control the flow rate of the water from the subnatant discharge pipe. A method of dewatering waste sludge is disclosed.

2 Claims, 4 Drawing Sheets

VERTICAL DRAINAGE DRYING BED FOR WASTE SLUDGE AND AN INTENSIFIED METHOD OF TREATING WASTEWATER

This is a division of co-pending application Ser. No. 08/285,053, filed Aug. 3, 1994.

TECHNICAL FIELD

The present invention relates to wastewater treatment facilities. More particularly, the present invention relates to a drying bed for dewatering waste sludge in a wastewater treatment facility and a method of treating wastewater which reduces the amount of sludge produced per unit of wastewater treated.

BACKGROUND OF THE INVENTION

Wastewater treatment by contact with activated sludge is well-known. In a typical wastewater treatment plant, the influent passes through a headworks for screening and grit removal and then a series of treatment processes. Screening removes roots, rags, cans and large debris. Grit is removed in a quiescent section of the headworks. Pre-aeration freshens wastewater and helps remove oil. This primary treatment of sedimentation and flotation removes settleable and floatable materials. A secondary treatment of blending the raw influent wastewater with return activated sludge biologically stabilizes wastewater by removing the suspended and dissolved solids. This activated sludge contains microorganisms which assimilate the waste materials. Disinfection kills pathogenic organisms in the clarified wastewater. The resulting effluent is then generally discharged to surface waters.

Upon entering the secondary treatment process, the raw wastewater is mixed in a first aeration tank with return activated sludge which typically comprises relatively high concentrations of microorganisms. The return activated sludge comes from a secondary clarifier, as discussed below. The mixture is aerated and agitated in a series of aeration tanks to facilitate the growth of the sludge. The addition of air induces the growth of the microorganisms living in the sludge. The microorganism, such as bacteria, fungi, and protozoa, feed on the raw wastewater to reduce and decompose the wastes in the wastewater. The aeration process is approximately 24 hours.

Following aeration, the mixture is allowed to settle in the secondary clarifier. The microorganisms and waste collect into larger clumps of material known as floc. The activated sludge floc separates from the water by gravitational force due to its higher specific gravity and settles on the bottom of the secondary clarifier. The water on the surface is removed to a disinfecting tank. This disinfected water is the plant effluent and is ready for disposal by dilution or direct discharge to surface waters. The activated sludge from the bottom of the secondary clarifier, known as return activated sludge, is pumped to the first aeration tank for mixture with the raw influent wastewater, thus completing the cycle.

Activated sludge is typically measured in terms of biochemical oxygen demand (BOD) in milligrams per liter (mg/l), which is the strength of the wastewater and primary food source for the microorganisms, and total suspended solids (TSS). Domestic raw wastewater typically is 250 mg/l BOD and 200 mg/l TSS. The return activated sludge solids concentration is typically between 2000–6000 mg/l TSS. The plant effluent is typically 10 mg/l for both TSS and BOD. The activated sludge continues to grow by assimilating waste products as it passes through the process.

Sludge dewatering may be accomplished by several methods, such as drying beds, sludge lagoons, withdrawal of wet sludge to land as topical fertilizer, and mechanical apparatus such as vacuum filters and centrifuges. Small capacity wastewater plants typically use drying beds for dewatering sludge. The drying process occurs by evaporation and percolation of the water from the sludge. Typical drying beds are 15 to 18 inches in height and have a drainage system under the bottom of the bed. The drainage system typically has a layer of coarse crushed rock, a layer of gravel, a layer of pea gravel and a cover layer of 6 to 8 inches of sand. The sludge is applied on top of the sand to a depth of approximately 12 to 14 inches. The drying time in warm weather is typically 4 weeks. Rain or other precipitation increases the drying period. Dried sludge is removed from the bed manually or with heavy equipment and may be used as a low grade fertilizer. The drainage water from the drying beds is typically returned to the headworks. The quantity of dried sludge produced is typically 60% of each unit of influent wastewater BOD treated.

Wastewater treatment plants utilizing drying beds have large spacial requirements in that as waste sludge is produced need to access drying beds is required. These plants are extremely susceptible to meteorological conditions. If it rains, the sludge rehydrates and requires increased drying time to remove the additional water. With large amounts of rain, the sludge will not dry. After drying the sludge is removed manually for disposal. Sludge is typically removed from the beds by a shovel.

Thus, a need exists for a wastewater treatment process that does not generate excessive sludge and has an effective sludge dewatering system which is not impacted by climate conditions.

SUMMARY OF THE INVENTION

The present invention solves the above-described problems in the prior art by providing an improved drying bed and method for dewatering waste sludge and an improved method of treating wastewater for reducing the amount of sludge produced.

Briefly described, the drying bed of the present invention comprises a holding tank for dewatering waste sludge in a wastewater treatment facility. The holding tank includes a bottom surface with a subnatant discharge pipe. A sludge inlet at an inlet end of the holding tank connects with a source of waste activated sludge for supply to the holding tank. The subnatant discharge pipe connects to a valve at a discharge end of the holding tank. At least one vertical drainage riser connects to the discharge pipe and extends upwardly in the holding tank. The vertical drainage riser includes spaced-apart openings for communicating water from the waste activated sludge into the vertical drainage riser. The water, being communicated into the vertical drainage riser and the discharge pipe, flows through the discharge valve at a predetermined rate for dewatering the sludge.

The present invention further provides a method of dewatering waste sludge created in a wastewater treatment facility. Briefly described, the method comprises the steps of filling a drying bed with waste activated sludge. The sludge separates from the water in the drying bed, first by sinking to the bottom and then floating to the surface. The water then communicates through one of a plurality of openings in a vertical drainage riser that extends upwardly from a subnatant discharge pipe disposed near the bottom of the drying bed. A valve connected to the discharge pipe is opened a predetermined amount for controlling the flow of water through the discharge pipe so that particulates are not carried by the flow of water through the openings. The water, being communicated into the vertical drainage riser and the discharge pipe, flows through the discharge valve for dewatering the sludge.

The present invention further provides a method of treating wastewater to reduce the amount of sludge produced per unit of wastewater treated. Briefly described, the method comprises supplying raw influent wastewater and return activated sludge to a mixing/balancing chamber, whereby microorganisms in the sludge aggressively feed on the influent wastewater. The activated sludge is removed by airlift from a lower portion of a settling chamber in the wastewater treatment facility. The mixture of the raw influent wastewater and the return activated sludge then flows in sequence through a series of aeration tanks agitated by injecting air into the mixture, whereby the microorganisms continue to grow and feed on the wastewater. The activated sludge then enter a calm settling chamber where the sludge and the water separate. The concentration of activated sludge is monitored, and upon reaching a predetermined concentration, a portion is transferred by airlift to a drying bed for dewatering the concentrated activated sludge and subsequent disposal.

The present invention further provides an airlift comprising a solids evacuation pipe having a lower open end for receiving solids, an upper open end for exiting solids, and a midsection defining a series of holes. A sealed manifold encloses the midsection of the solids evacuation pipe. An air supply line connects at one end to a supply of pressurized air and the other end connects to the interior of the manifold. The air, being introduced through the holes into the solids evacuation pipe, produces lift for causing the solids to enter the lower open end of the solids evacuation pipe and to exit the upper open end of the solids evacuation pipe.

The features and advantages of the present invention will become apparent from a reading of the following specification, in conjunction with the drawings and appended claims.

DETAILED DESCRIPTION

Figure 1:
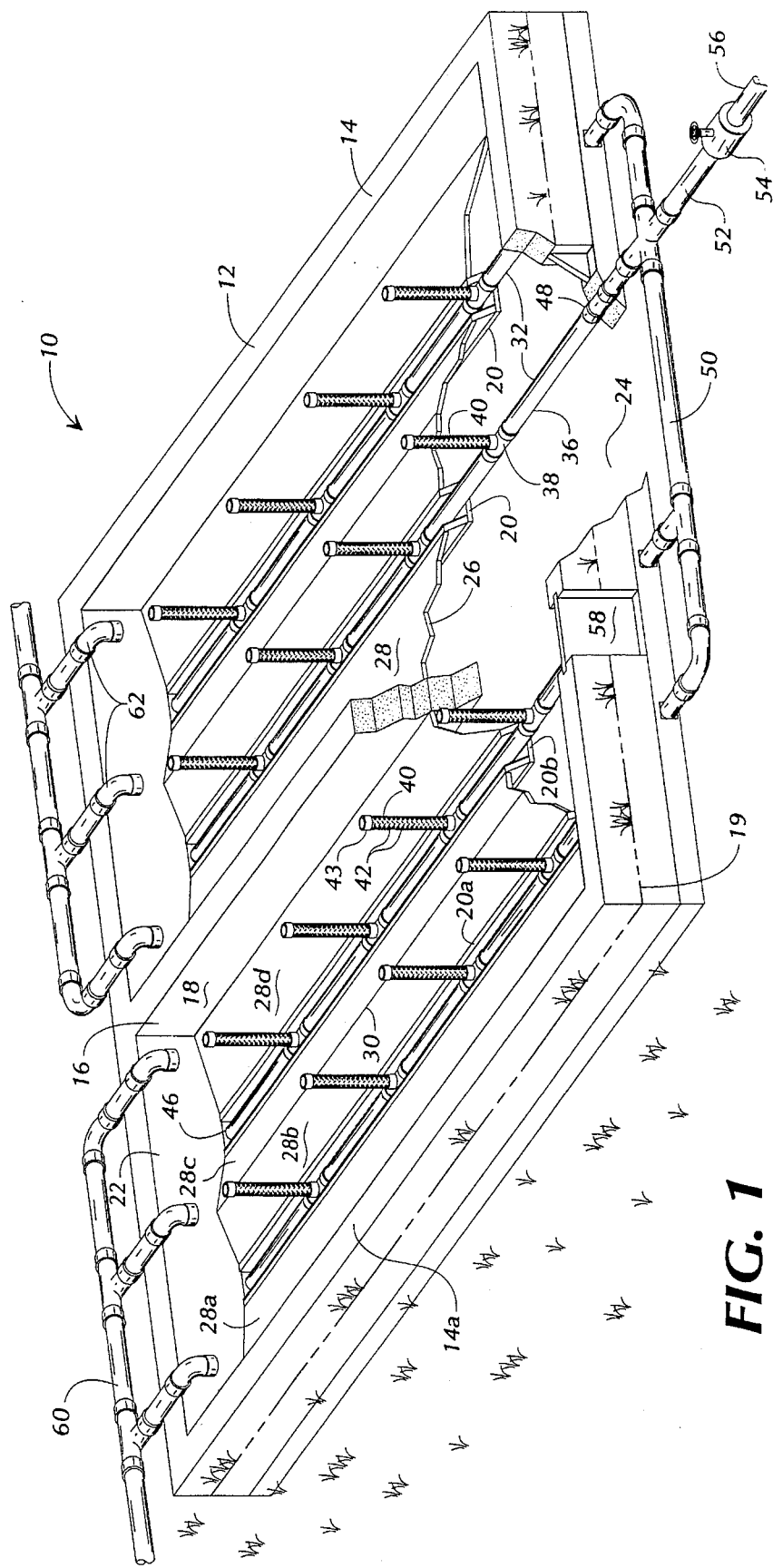
FIG. 1 is a perspective view of a drying bed for dewatering of waste sludge according to the present invention.

Referring now in more detail to the drawings, in which like numerals indicate like parts throughout the several views, FIG. 1 shows a perspective view of a preferred embodiment of a drying bed 10 according to the present invention. The drying bed 10 in the illustrated embodiment comprises a concrete basin 12 formed with exterior walls 14 and divided into two holding tanks 16 by a wall 18. The drying bed 10 in the illustrated embodiment is partially below ground level 19. Each holding tank 16 includes a pair of recessed trenches 20 that extend between an inlet side 22 of the tank to a discharge side 24. A bottom floor 26 of the tank 16 comprises four plates 28 that taper at a small angle downwardly to a respective upper edge of one of the trenches 20, for inducing water flow to the trenches 20. For example, the plate 28a tapers from the exterior wall 14a to the upper edge of the trench 20a. The plates 28b and 28c taper in opposite directions from a ridge 30 towards the upper edge of the respective trenches 20a and 20b. The plate 28d tapers downwardly from the wall 18 to the trench 20b.

Each trench 20 holds a subnatant discharge pipe 32 which is buried in gravel. The subnatant discharge pipe 32 preferably assembles by connecting lengths of flexible pipes 36 together with T-connectors 38. In the illustrated embodiment, the pipes 36 are approximately three meters long. The pipes 36 preferably are perforated with openings, for a purpose discussed below. A vertical drainage riser 40 connects at a lower end to the T-connector 38 and extends upwardly from the trench 20. In the illustrated embodiment, the vertical drainage riser is a cylindrical pipe. The vertical drainage riser 40 includes a series of holes 42 for communicating water from waste activated sludge (WAS) in the drying bed 10 to a discharge pipe, as discussed below. A removable cap 43 closes an upper distal end of the pipe 40.

An end 46 of the subnatant discharge pipe 32 abuts the wall 14 at the inlet side 22 of the tank 16. The end 46 is closed by a cover. An outlet end 48 of the subnatant discharge pipe 32 connects to an outlet manifold 50 which receives fluid flow from each of the subnatant discharge pipes 32. A pipe 52 connects the manifold 50 to a valve 54. An effluent return pipe 56 connects the valve 55 to an input of a wastewater treatment facility, for a purpose discussed below.

The wall 14 at the discharge end 24 of the tank includes a gate 58. The gate 58 is removable and sized for permitting entrance into the tank 16 by a small front-end loader or other such apparatus for removal of dried sludge.

An inlet manifold 60 connects to a supply of WAS at the inlet side 22 of the tank 16. The inlet manifold communicates the WAS from a clarifier in the wastewater treatment facility to the drying bed 10. Downspouts 62 connect the manifold 60 to supply the WAS to the tank 16. Although not illustrated, each downspout 62 can be connected to a valve for selective supply of the WAS to one of the tanks 16.

Figures 2, 2A:
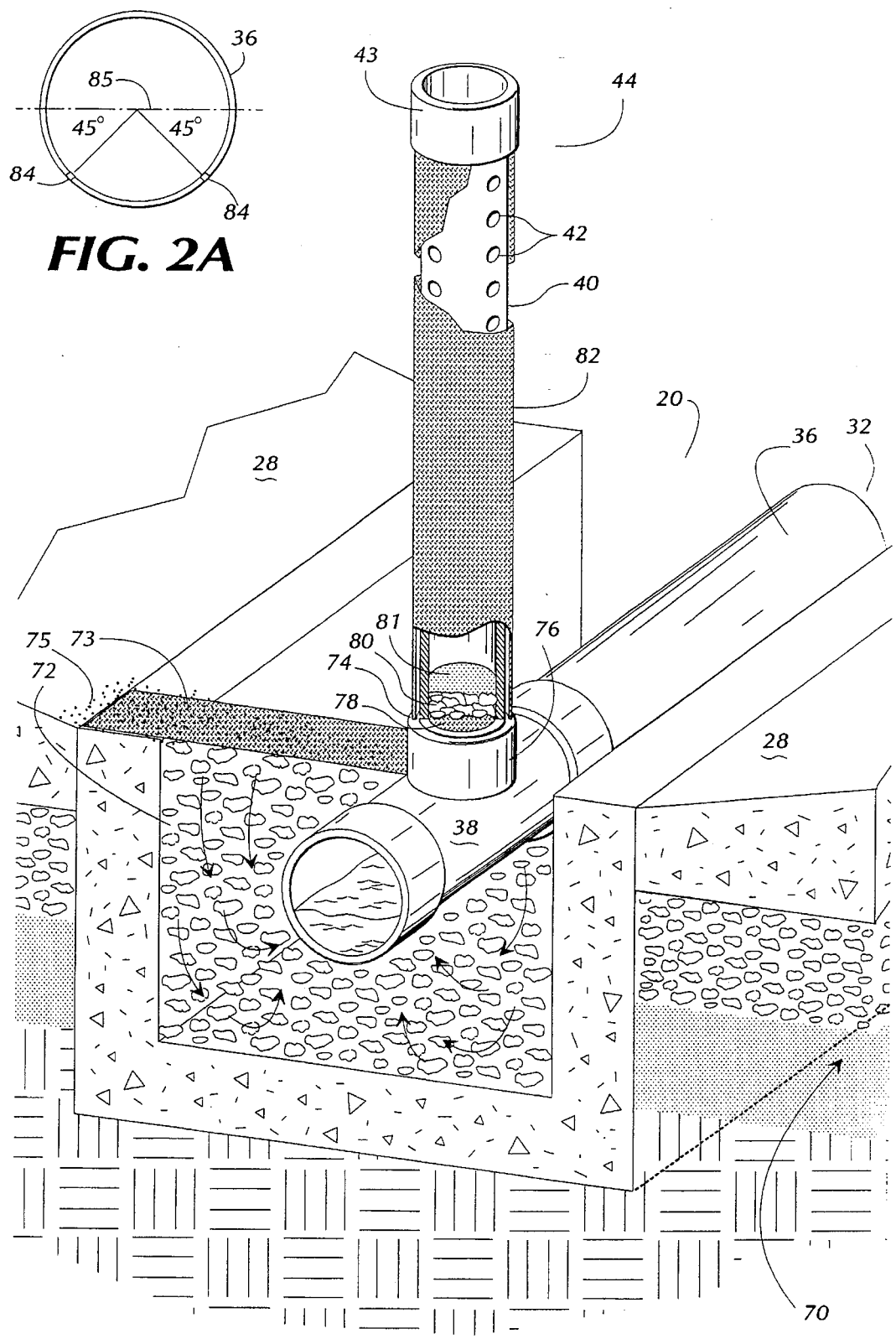
FIG. 2 is a perspective view of a portion of the drying bed illustrated in FIG. 1, to show details in a cutaway view.
FIG. 2A is a cross-sectional view of the horizontal flexible pipe in FIG. 2.

FIG. 2 is a perspective view of a cut-away portion of the drying bed 10 for illustrating details of the connection between the subnatant discharge pipe 32 and the vertical drainage riser 40. The drying bed 10 preferably is conventional form-cast concrete on a soil, sand and gravel foundation generally designated 70. The trench 20 is filled with gravel 72 in which the subnatant discharge pipe 32 is embedded. A mesh screen 73 lays across and covers the opening of the trench 20. The mesh screen 73 is preferably a metal screen having a mesh of about one millimeter. A layer of sand 75 covers the mesh screen 73. The sand has a depth of preferably about 25 millimeters. The pipes 36 connect together with the T-connectors 38. The vertical drainage risers 40 extend upwardly from the T-connectors. The vertical drainage risers 40 preferably are rigid and each include a number of spaced-apart openings 42. In a preferred embodiment, a lower portion comprising about one-third the length of the pipe 40 has a first set of openings each with a diameter of six millimeters. An upper portion of about two-thirds the length of the pipe 40 has a second set of openings each with a diameter of three millimeters. The openings are spaced apart about thirty-two millimeters.

A filter media 74 mounts inside an upwardly extending leg 76 of the T-connector 38. The filter media 74 in the illustrated embodiment comprises a mesh screen 78 mounted transverse to a direction of flow through the leg 76. The mesh screen 78 supports layers of gravel 80 and of sand 81. The gravel 80 is about 25 millimeters in diameter and has a depth of about 38 millimeters. The sand 81, which is mounted on top of the gravel 80, has a depth of about 25 millimeters.

A mesh screen 82 wraps around the vertical drainage riser 40 for filtering the water entering the vertical drainage riser. The mesh screen 82 is preferably an aluminum or plastic screen having a mesh of about 0.5 millimeters. Straps (not illustrated) secure the mesh screen 82 around the vertical drainage riser 40, although other connecting mechanisms can be used.

The pipe 36, which is preferably polyvinyl chloride plastic, includes openings 84 which are spaced apart approximately 20 cm. The openings 84 are oriented at about a downward 45 degree angle from a line defined by a longitudinal axis 85 of the pipe 36, as best shown in FIG. 2A. In a preferred embodiment, the pipes 36 are disposed in the gravel at a slope from the input end 22 to the discharge end 24 of the drying bed. The slope is preferably about 20 degrees.

Figure 3:
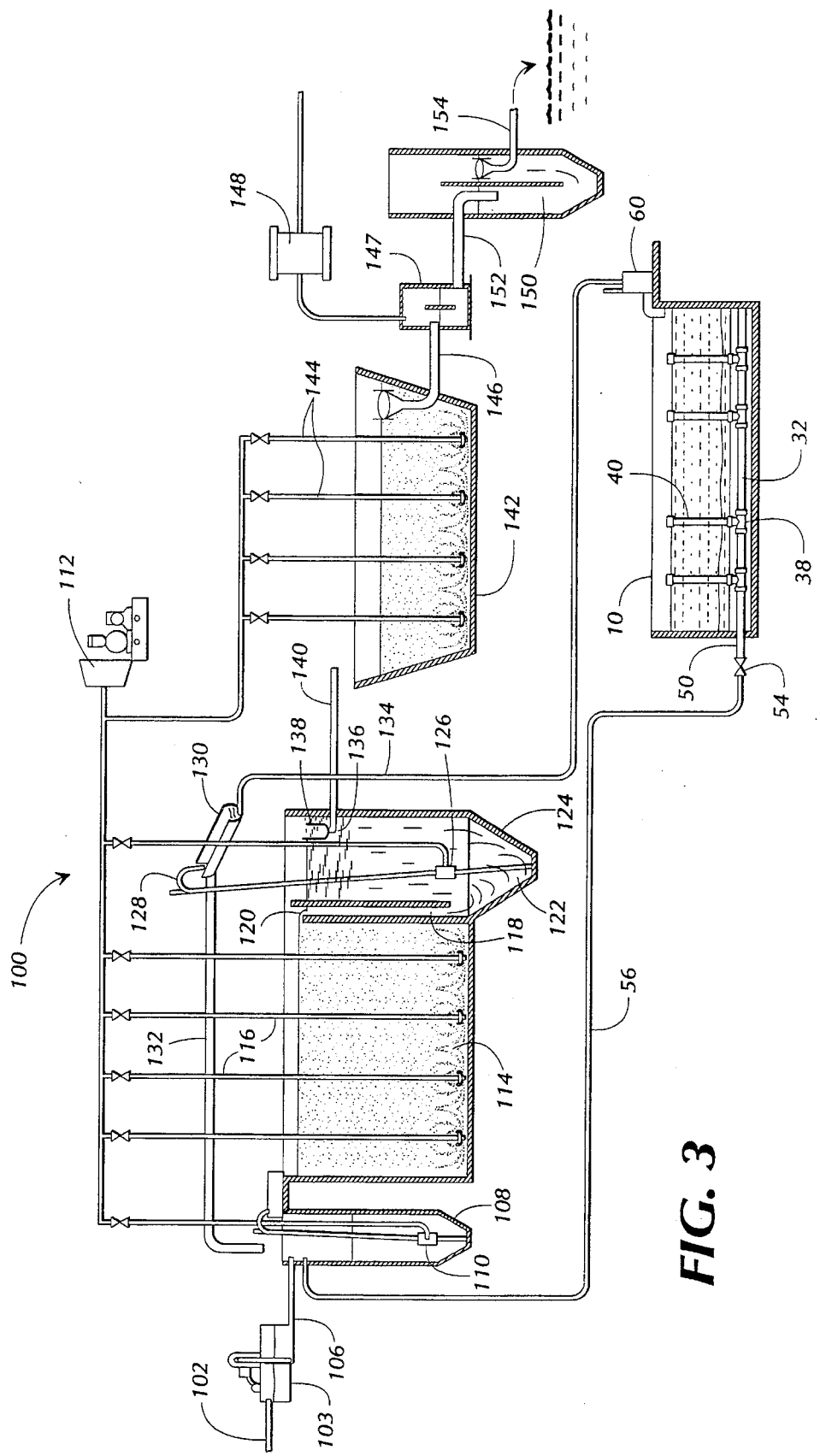
FIG. 3 is a plan view of a facility for treating wastewater to reduce the amount of sludge produced per unit of wastewater treated and for dewatering sludge using the drying bed illustrated in FIG. 1.

FIG. 3 is a schematic diagram of a wastewater treatment facility 100 that uses the drying bed 10 of the present invention. The facility 100 includes an influent supply 102 that communicates with chambers 103 having bar screens for catching large solids such as sticks, roots, cans and other large debris, and for breaking up dissolvable solids that may be carried in the wastewater. Bar screens are conventional in the art for such purposes. A pipe 106 connects the chambers 103 with a mixing/balancing chamber 108. An airlift 110, described in more detail below, is disposed in the chamber 108. The airlift 110 has a lower open end and connects near the lower end to a supply of pressurized air, such as a blower 112. The airlift 110 extends upwardly with an open distal end communicating with an aeration tank 114. The aeration tank 114 includes air supply pipes 116 that communicate with the blower 112.

A ten centimeter outlet channel 118 at one end of the aeration tank 114 has a recessed lip 120 over which mixed liquor flows. The outlet channel 118 communicates with a lower portion 122 of a secondary clarifier 124. Another airlift 126, similar in construction to the airlift 110 in the mixing/balancing chamber 108, is disposed in the secondary clarifier 124 and has an open lower end. The airlift 126 connects near the lower end to the supply of pressurized air 112. An upper open end 128 connects to a diverter 130, such as a valve tree, or the like. The diverter 130 connects through a pipe 132 to the mixing/balancing chamber 108 and connects through a pipe 134 to the input manifold 60 of the drying bed 10.

The secondary clarifier 124 includes a discharge launder 136 having a recessed lip 138. Clarified water travels over the lip 138 into a pipe 140 that communicates with an tertiary aeration pond 142. The aeration pond 142 includes air pipes 144 for communicating air from the blower 112 into the pond. A discharge pipe 146 opens at an upper edge of the pond 142 for receiving water from the pond. The discharge pipe 146 communicates with a chlorine contact chamber 147 which receives disinfectants from a supply 148. A discharge chamber 150 receives the chemically treated water from the chamber 146 through a pipe 152. An outlet 154 from the chamber 150 communicates with surface waters or temporary holding pond for subsequent discharge to surface waters.

The drying bed 10 includes the discharge manifold 50 as discussed above. The valve 54 controls flow of water from the drying bed through the discharge pipe 56 which connects the mixing/balancing chamber 108.

Figure 4:
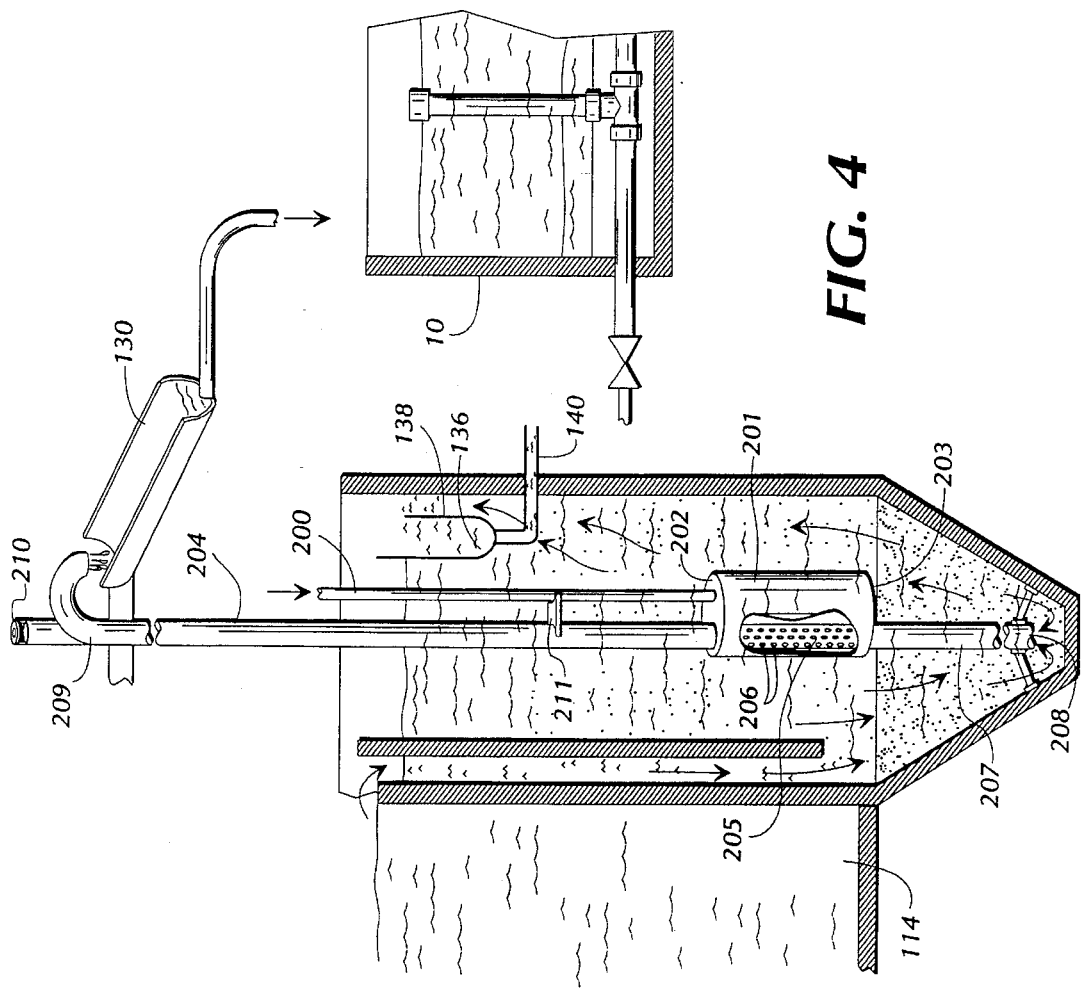
FIG. 4 is an enlarged view of the secondary clarifier of FIG. 3 detailing an airlift of the present invention.

FIG. 4 is an enlarged view of the secondary clarifier 124 showing details of the airlift 126, as well as the airlift 110. The airlift 126 includes an air supply line 200 that is connected at its upper end to the blower 112 and at its lower end to a manifold 201. The manifold 201 is a sealed cylinder having an upper end 202 and a lower end 203. The air supply line 200 opens into the interior of the manifold 201. A sludge evacuation pipe 204 extends through the upper end 202 and the lower end 203 of the manifold 201. The manifold 201 thereby encloses a midsection 205 of the sludge evacuation pipe 204. The midsection 205 contains a series of spaced-apart holes 206. A lower section 207 of the sludge evacuation pipe 204 extends to the bottom of the secondary clarifier 124 and receives sludge and water through an opening 208 as discussed below. An upper section 209 of the sludge evacuation pipe 204 extends out of the secondary clarifier 124 and divides into an air port 210 and the diverter 130. The sludge evacuation pipe 204 and the lower end of the air supply line 200 are offset near the sides of the manifold 201. A brace 211 connected between the air supply line 200 and the sludge evacuation pipe 204 may be used to provide support for the air supply line 200.

Figure 5:
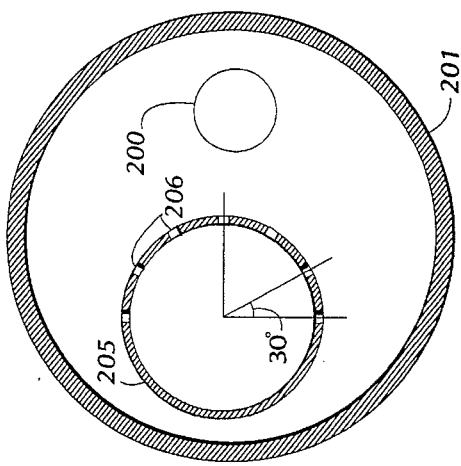
FIG. 5 is a cross-sectional view of a mid-portion of a sludge evacuation pipe within a manifold, which is a component of the airlift of FIG. 4.

FIG. 5 shows a cross-section view of a preferred embodiment of the midsection 205 within the manifold 201. The holes 206 are preferably in a semi-circular pattern covering one half of the midsection. There are seven columns of holes 206. Each hole 206 is spaced-apart approximately thirty degrees. The midsection preferably includes twenty rows of holes 206 that are four millimeters in diameter. The manifold 201 has a height of twenty centimeters such that the holes 206 are enclosed within the manifold.

The drying bed 10 shown in FIG. 1 is used with the wastewater treatment facility 100 shown in FIG. 3. Raw wastewater enters the facility 100 through the influent supply 102. While in chambers 103, bar screens (not shown) catch large solids and break up dissolvable solid that may be carried in the raw wastewater. The resulting influent travels through the pipe 106 to the mixing/balancing chamber 108. The mixing/balancing chamber 108 also receives concentrated activated sludge recovered from the secondary clarifier 124. This sludge is conventionally known as return activated sludge (RAS). The RAS from the secondary clarifier 124 travels through the pipe 132 into the mixing/balancing chamber 108. Also, subnatant water from the drying bed 10 travels through the pipe 56 to the mixing/balancing chamber 108.

The microorganisms in the secondary clarifier 124 settle to the bottom prior to transfer to the mixing/balancing chamber 108. The microorganisms in the sludge become dormant as they are increasingly deprived of oxygen and assimilate food. After transfer to the mixing/balancing chamber 108, the microorganisms in the RAS become aggressively active in feeding on the waste products and nutrients in the influent and in reproducing. The nutrient content of the materials in the mixing/balancing chamber 108 is monitored. As necessary, additional nitrogen and phosphorus are added, so that the fluid mixture in the chamber 108 has a controlled nutrient concentration ratio, with a preferred nitrogen ratio of about one percent and a phosphorus ratio of about 5 percent. This provides optimum nutrients on which the microorganisms in the wastewater reproduce.

The environment of the chamber 108 induces rapid growth and increased feeding since it is provided with additional nitrogen and phosphorus and the influent wastewater itself is high in food content for the microorganisms. The increased microorganism activity prior to entering the aeration process accelerates the assimilation of wastes. More microorganisms are available to stabilize the more wastewater. The end result is a process that produces approximately 10% sludge per unit of wastewater treated.

The present invention accordingly improves conventional wastewater treatment facilities in which the RAS is merely communicated to the first aeration tank. In conventional facilities, the RAS enters the first aeration tank in which the food content of the influent has been significantly diluted. As a result conventional process generate about 65% sludge per unit of wastewater treated.

The air lift 110 as described above communicates the nutrient-rich balanced wastewater known as mixed liquor from the mixing/balancing chamber 108 to the aeration tank 114. The air flow moves the sludge and water upwardly through the air lift 110 to the aeration tank 114.

Air pipes 116 communicate with the blower 112 to inject air into the microbe-active mixed liquor the aeration tank 114. The air provides oxygen for the microorganisms to live. The injection of air into the lower portion of the aeration tank 114 turbulently stirs the mixed liquor in the tank. This thoroughly mixes the microorganisms and the waste materials and adds oxygen content. The microorganisms ingest the waste materials in the mixed liquor. The microorganisms grow. The waste materials also adhere to the microorganisms. The waste and microorganisms clump together forming floc.

The mixed liquor flows over the recess lip 120 of the outlet channel 118 at one end of the aeration tank 114. The mixed liquor flowing through the outlet channel 118 carries the floc clumps of waste materials and microorganisms.

The inflow through the channel 118 enters a lower portion of the secondary clarifier 124. This area in the secondary clarifier is calm. The sludge settles to the lower portion of the secondary clarifier 124. The accumulated sludge is picked up by the air lift 126 for communication through the diverter 130 to either the mixing/balancing chamber 108 or to the drying bed 10.

With reference to FIG. 4, the airlift 126 operates by the introduction of air through the air supply line 200. The air enters the manifold 201 and flows through the holes 206 of the mid-section 205 of the sludge evacuation pipe 204. The air bubbles up the sludge evacuation pipe 204 to exit at the air port 210. The air flow creates a lift in the sludge evacuation pipe 204 thereby moving the WAS from the lower portion 122 of the secondary clarifier 124 to the diverter 130 for either return to the mixing/balancing chamber 108 or dewatering in the drying bed 10.

The airlift 126 of the present invention introduces air at more than one point in the sludge evacuation pipe 204. The air flow from the manifold 201 through the numerous holes 206 improves the lift for elevating the WAS. Having holes 206 covering one-half of the mid-section 205 minimizes the separation of solids and liquids thereby enhancing the physical movement of the WAS. This particular type of airlift may be employed to remove other types of liquid materials containing suspended solids.

By using the airlift 126, electric pumps are no longer needed. Pumps stress the microorganisms. The pumps also shearing the microorganisms in the WAS. This typically kills many of the microorganisms and causes separation of the solids and liquids. Thus, the WAS is more effectively maintained for the reproduction of waste-assimilating microorganisms.

Introduction of air by the airlift 126 also stimulates the microorganisms after being dormant in the lower portion 122 of the secondary clarifier 124. Aeration is now provided at a critical stage for reactivation of the WAS prior to returning to the mixing/balancing chamber 108.

In FIG. 3 the air that communicates from the blower 112 is introduced into the wastewater treatment process at various points. It is preferred that all of these points of introduction be on the same level to maintain balanced air pressure within the process.

The activated sludge in the lower portion 122 of the secondary clarifier 124 is selectively sent to the drying bed 10 when the concentration of total suspended solid in the activated sludge is between about 6,000 and 10,000 milligrams per liter. Otherwise, the activated sludge or RAS is communicated to the mixing/balancing chamber 108.

The clarified wastewater in the top of the secondary clarifier 124 overflows the recess lip 138 of the discharge launder 136. The clarified water travels through a pipe 140 into a tertiary aeration pond 142. Air pipes 144 communicate air from the blower 112 into the pond 142. The aerated water overflows into a discharge pipe 146 which communicates with a chlorine contact chamber 147. Disinfectants such as chlorine, or stabilizers such as lime or chlorine are added to chemically neutralize the biologically active microorganisms and other pathogens in the water. The treated water is discharged through an outlet 152 to surface waters. In the illustrated embodiment, the treated water passes through a discharge chamber 150 prior to discharge to a river or temporary holding pond.

As discussed above, activated sludge or WAS is periodically wasted to drying bed 10. The floc, or sludge, in the secondary clarifier 124 is sampled to determine TSS concentration. There are a number of conventional tests for determining concentration, including a centrifuge, mass balance, or settleometer. When the sludge reaches TSS concentrations of between about 6,000 and 10,000 milligrams per liter, the sludge is diverted to the drying bed 10. Typically, sludge reaches concentrations of 10,000 milligrams per liter in about seven days.

Prior to introducing the WAS to the drying bed 10, the valve 54 is closed. The diverter 130 is then opened to communicate the sludge through the pipe 134 to the inlet manifold 60. The WAS is delivered through the nozzles 62 to fill the tank 16. During the initial 30 minutes the sludge slowly settles to the bottom 28 which forms stratified layers of water and sludge. The active sludge does not mass and compact together as does inactive sludge. The settling activated floc instead leaves pathways known as capillaries for flow of free water.

After about 6 to 8 hours, a natural process of denitrification occurs and the sludge begins to float to the surface and reverse the stratified layers. The waste sludge is in a top layer floating on the water below. The valve 54 is then opened to provide a controlled flow of water from the drying bed. A settleometer (not shown) may be placed on the pipe 52 adjacent the valve 54 to observe the denitrification process and the flow of water from the dry bed 10. For the first hour the valve 54 is opened halfway for a rate of flow of about 3.5 millimeters per second. Thereafter, the valve 54 is fully opened to a preferred rate of flow of about 7 millimeters per second. The water in the tank 16 communicates by capillary action through the mesh screen 82 and the holes 42 in the vertical drainage riser 40. This low flow rate by capillary action facilitates transfer of the water without a forceful rush that would carry particulate matter through the screen 82. Such forceful carrying of particulate matter through the screen would deposit excess sludge solids in the subnatant discharge pipe 32 thereby restricting subnatant water flow. The water travels down the vertical drainage riser 40 through the T-coupler 38 to the subnatant discharge pipe 32. Water near the bottom of the holding tank 16 flows through the sand 75 and the mesh screen 73 into the trench 20. The sand 75 and the mesh screen 73 substantially prevent the gravel 72 from becoming clogged with particulate matter. Once the water within the trench 20 reaches a level equivalent to the holes 84 in the subnatant discharge pipe 32, the water flows into the subnatant discharge pipe through the holes 84. The subnatant water in the subnatant discharge pipe 32 then returns through the effluent return pipe 56 to the mixing/balancing chamber 108. The concentration of the subnatant water is approximately 40 to 70 mg/l TSS.

Additional applications of activated sludge from the secondary clarifier 124 to the drying bed 10 can be applied during the drying process while maintaining efficient dewatering of the sludge in the bed. This is an improvement over conventional drying beds. For example, the available volume in a drying bed may be required to handle excess flows caused by storm runoff. The limited capacity of the conventional drying bed prevents the treatment facility from handling the excess inflow. In that event, raw sewage may be discharged into streams or lakes. The drying bed 10 of the present invention however can be deep, for example ten feet deep, as compared to the conventional drying bed of about 14 inches, thereby providing additional treatment capacity during storm events. The deeper drying bed 10 further enhances the dewatering process, in that the resulting pressure at the lower portion of a deeper drying bed will be greater than a shallow drying bed. This facilitates the drainage of water through the vertical drainage risers 40 and the drainage pipes 32.

After the flow of subnatant water from the drying bed 10 slows or stops, the raw sediment is dried for four to seven days under the influence of solar radiation until the moisture content is about 60 to 70 percent. The dried sediment is now ready to be removed for disposal. The vertical drainage risers 40 are removed and backwashed to clean the interior of the pipes and the mesh screens 82. In the illustrated embodiment, the gate 58 is opened and a front end loader is employed to scoop up the sediment and deliver it to a truck for disposal. The subnatant discharge pipes 32 are likewise washed, if necessary, as is the floor of the holding tank 16 before another volume of sludge is received for dewatering.

Thus, there has been described a wastewater treatment method with an improved airlift and a drying bed and method having improvements and benefits over conventional methods and drying beds. The present invention eliminates the digester, significantly reduces the volume of sludge produced per unit of wastewater treated, and reduces the drying time of sludge even in periods of precipitation.

The principles, preferred embodiments, and modes of operation of the present invention have been described in the foregoing specification. The invention is not to be construed as limited to the particular forms disclosed because these are regarded as illustrative rather than restrictive. Moreover, variations and changes may be made by those skilled in the art without departing from the spirit of the invention as described by the following claims.

What is claimed is:

1. A method of dewatering waste sludge in a drying bed for a wastewater treatment facility, comprising:

supplying watery activated waste sludge through an inlet at one end of a holding tank having a bottom surface;

separating the water and the sludge by settling the waste sludge for a sufficient period until the waste sludge stratifies with the sludge floating on a lower layer of water;

opening a valve in a subnatant discharge pipe placed near the bottom surface of the drying bed for communicating water at a predetermined rate from the waste sludge through openings in a vertical drainage riser that extends upwardly in the drying bed from the subnatant discharge pipe; whereby the water, being communicated through the vertical drainage riser and the subnatant discharge pipe, flows out of the drying bed through the valve for dewatering the sludge.

2. The method as recited in claim 1, further comprising the step of communicating the water through a screen having a mesh of about 0.5 millimeters wrapped around the vertical drainage riser.

* * * * *